(12) United States Patent
Nambu

(10) Patent No.: US 6,237,635 B1
(45) Date of Patent: May 29, 2001

(54) EXHAUSTER PRESSURE CONTROL SYSTEM

(75) Inventor: Masahiro Nambu, Omiya (JP)

(73) Assignee: Aera Japan Ltd., Tokyo (JP)

( * ) Notice: Subject to any disclaimer, the term of this patent is extended or adjusted under 35 U.S.C. 154(b) by 0 days.

(21) Appl. No.: 09/579,751

(22) Filed: May 26, 2000

(30) Foreign Application Priority Data

Jun. 25, 1999 (JP) .................................. 11-179507

(51) Int. Cl.⁷ .......................... F16K 31/12; F15B 13/044
(52) U.S. Cl. ................................. 137/625.69; 137/487.5
(58) Field of Search ........................... 137/487.5, 625.69, 137/625.67

(56) References Cited

U.S. PATENT DOCUMENTS

| | | | |
|---|---|---|---|
| 3,548,866 | * 12/1970 | Kaiser et al. | 137/487.5 |
| 4,133,511 | * 1/1979 | Hartmann et al. | 137/487.5 X |
| 4,212,334 | * 7/1980 | Dudar | 137/487.5 X |
| 4,724,864 | * 2/1988 | Schwelm | 137/487.5 X |
| 5,000,221 | 3/1991 | Palmer . | |
| 6,065,487 | * 5/2000 | Watson | 137/625.69 X |
| 6,073,644 | * 6/2000 | Friedmann et al. | 137/487.5 X |

FOREIGN PATENT DOCUMENTS 4-150938    5/1992 (JP) .
7-317919   12/1995 (JP) .

* cited by examiner

*Primary Examiner*—Kevin Lee
(74) *Attorney, Agent, or Firm*—Pearne & Gordon LLP

(57) ABSTRACT

An exhauster pressure control system capable of keeping the gas pressure constant regardless of variation in the flow rate of the gas to be controlled. An inlet port 22 and an outlet port 24 are formed in a main body 20 and a spool 40 is held against sliding surfaces 29a and 29b by a spring 28. A pilot chamber 30 is located below the spool 40 and an internal pressure of the pilot chamber is held above a gas pressure at the inlet port 22. A pressure sensor S to detect the gas pressure at the inlet port 22, a control valve V to supply regulating gas to the pilot chamber 30 and a control circuit C to drive the control valve V according to an output of the pressure sensor are provided outside the main body 20, wherein the gas pressure at the inlet port 22 as detected by the pressure sensor S is fed back to the control circuit C, thereby actuating the control valve V to supply regulating gas to the pilot chamber.

10 Claims, 8 Drawing Sheets

EXHAUSTER PRESSURE CONTROL SYSTEM

BACKGROUND OF THE INVENTION

1. Field of the Invention

This invention relates to the field of pressure control systems to control the exhaust pressure in exhausters or exhaust apparatus.

Description of the Prior Art

In oxidation, diffusion or CVD devices or similar devices, after various gases are supplied into the chamber for reaction, the gases which have passed through the reaction process are exhausted by the exhauster.

In this process, because a sudden change in the internal pressure of the chamber might bring an adverse effect on the reaction process in the chamber, a pressure control system is provided in the exhauster so that a constant exhaust gas pressure is maintained at any time, regardless of any change in the flow rate of the gas being exhausted and any change in the pressure in the downstream of the exhauster.

One example of this kind of exhauster pressure control system is the one defined in the U.S. Pat. No. 5,000,221. As shown in FIG. 7, in the pressure control system 100 according to that specification, a piston 300 is provided in the inside space of the main body in which an inlet port 220 and an outlet port 240 are formed; the piston 300 moves back and forth in the space according to variation in the pressure at the inlet port 220 and outlet port 240 to make the fluid pressure at the inlet port 220 constant.

Moreover, other examples of such pressure control systems are those defined in the unexamined Japanese Patent Publications Nos. 150938/92 and 317919/95. As shown in FIG. 8, the pressure control system 102 as defined there turns the valve disc 302 provided between the inlet port 222 and the outlet port 242 to open or close the fluid passage whose cross section is circular. By monitoring the pressure at the inlet port 222 and feeding back the output to the servo motor 400, the valve disc 302 is turned so as to adjust its opening.

FIG. 9 shows the characteristic of the pressure control system 100 as shown in FIG. 7. In this pressure control system 100, which is not a system that detects the pressure at the inlet port 220 and feeds back the detected pressure to operate the piston 300, the position of the piston 300 varies depending on the flow rate. Pressure variation caused by flow rate changes is considerable as shown in FIG. 9, resulting in poor stability. Even when stability is achieved, there remain problems relating to shift and hysteresis.

FIG. 10 shows the characteristic of the pressure control system as shown in FIG. 8. In this pressure control system 102, the pressure at the inlet port 222 as detected by the pressure sensor is fed back to the servo motor 400 to turn the valve disc 300. The accuracy in the control pressure is comparatively high, but, as shown in FIG. 10, the magnitude of pressure variation caused by flow rate changes is considerable, resulting in poor stability.

BRIEF DESCRIPTION OF THE INVENTION

The problems of the prior art are solved according to the present invention which is characterized by an exhauster pressure control system comprising a main body in which an inlet and an outlet port are formed and a pilot chamber is provided, and a spool with a valve. A valve seat is formed on sliding surfaces connecting the inlet and outlet ports in said main body and said spool is held against said sliding surfaces by the force of a spring. The system includes a pressure sensor to detect the pressure at said inlet port, a control valve to supply regulating gas to said pilot chamber and a control circuit to drive said control valve according to the output of said pressure sensor.

Regulating gas is supplied to the pilot chamber according to the gas pressure at the inlet port and the pilot chamber internal pressure moves the spool axially to open or close the valve. Therefore, the gas pressure at the inlet port can be held constant only by adjusting the pressure of regulating gas, regardless of the gas pressure at the outlet port.

In addition, the gas pressure at the inlet port is detected by the pressure sensor and the output of the sensor is fed back, which results in improvement of the response to gas flow rate variation at the inlet port and improved accuracy and stability.

DETAILED DESCRIPTION OF THE INVENTION

Figure 1:
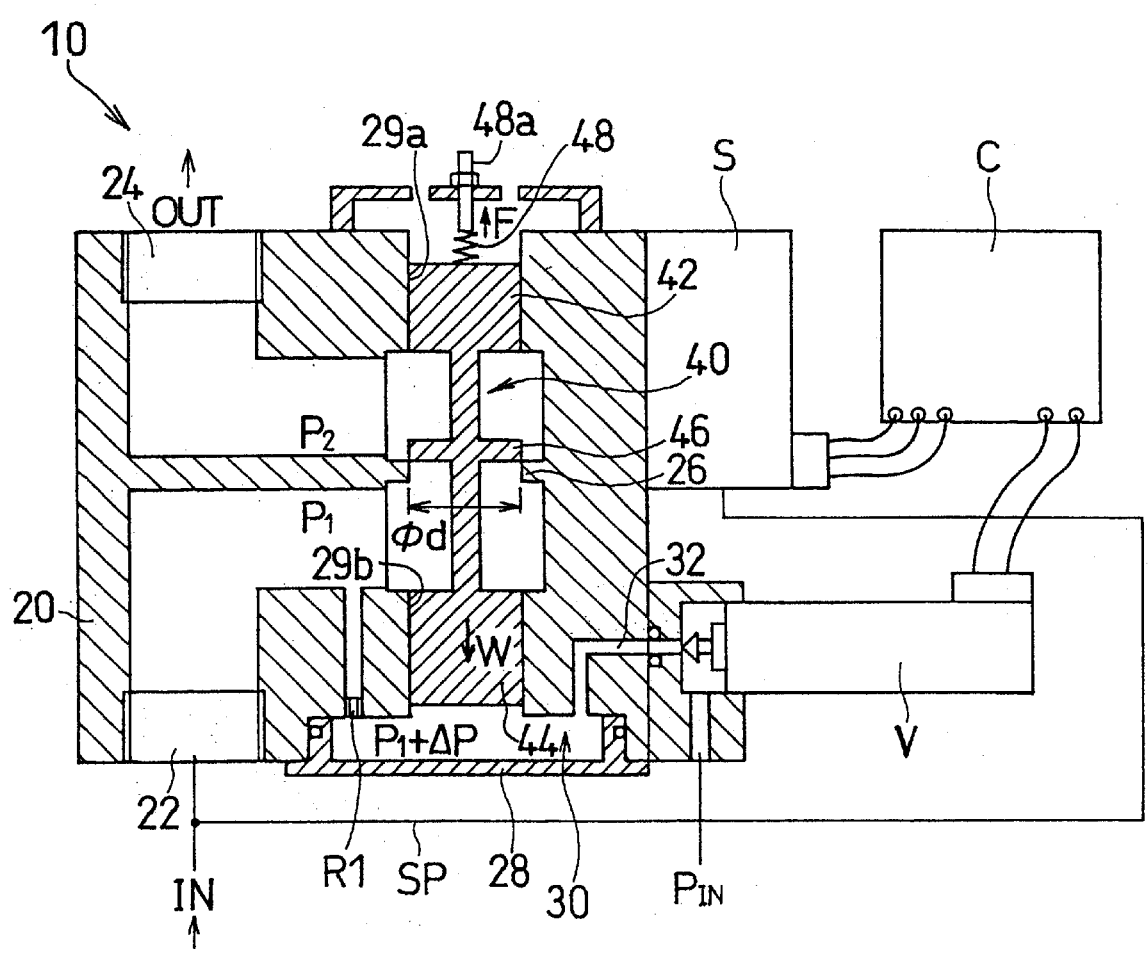
FIG. 1 is a partially schematic sectional view of the structure of the pressure control system according to the first embodiment of the invention.

FIG. 1 shows the structure of a pressure control system 10 according to a first embodiment of the invention. In this pressure control system 10, an inlet port 22 and an outlet port 24 are formed in a main body 20 and a spool 40 is held against sliding surfaces 29a and 29b.

The inlet port 22 is connected to an exhaust port (not shown) in the chamber of oxidation, diffusion or CVD devices or similar devices.

At the bottom of the main body 20, there is a pilot chamber 30 covered by a bottom cover 28. This pilot chamber 30 is connected to the inlet port 22 through a restrictor R1.

Connected to the main body 20 are a control valve V which supplies regulating gas such as nitrogen to the pilot chamber 30 through a pilot passage 32, a pressure sensor S which detects the pressure at the inlet port 22, and a control circuit C which drives the control valve V according to the output of the pressure sensor S.

The spool 40 is connected to the upper part of the main body 20 by spring 48 and can axially slide on the sliding surfaces 29a and 29b of the main body 20 through the upper sliding section 42 and lower sliding section 44 provided above and below the spool 40, respectively.

Also a valve 46, to fit the valve seat 26 formed in the main body, is provided in the axial center of the spool 40. As the spool 40 slides upward in the axial direction, a gap is generated between the valve 46 and the valve seat 26, causing the inlet port 22 and outlet port 24 to be in communication with each other.

The spring force F, biasing the spool 40, can be adjusted by means of the spring adjusting screw 48a.

Regulating gas is supplied to the pilot chamber 30 through the pilot passage 32 by means of a control valve V so that the internal pressure of the pilot chamber 30 is higher than the gas pressure at the inlet port 22 by a difference of ΔP.

In this pressure control system 10, the internal pressure of the pilot chamber 30 is expressed by the equation, $P_1+\Delta P$, and thus the equilibrium of the spool 40 is expressed by the following equation:

$$F - W + \tfrac{1}{4} \cdot \pi d^2 \cdot (P_1 + \Delta P) = 0,$$

where F denotes the spring force, W is the weight of the spool 40, $P_1$ is the gas pressure at the inlet port 22, $P_2$ is the gas pressure at the outlet port 24 and d is the diameter of the valve 46 on the spool 40.

Therefore, the gas pressure $P_1$ at the inlet port 22 is expressed by the following equation:

$$P_l = \frac{4}{\pi d^2} \cdot (W - F) - \Delta P.$$

Here, since the weight W of the spool 40 is constant, the gas pressure $P_1$ at the inlet port 22 depends only on the spring force F and the pressure difference ΔP between the pilot chamber 30 and inlet port 22. $P_1$ is independent of the gas pressure $P_2$ at the outlet port 24.

This means that, in order to keep the gas pressure $P_1$ at the inlet port 22 constant, the pressure of regulating gas from the control valve V should be adjusted so that the spring force F and the pressure difference ΔP between the pilot chamber 30 and the inlet port 22 are constant.

The principle of operation of the pressure control system 10 as shown in FIG. 1 is explained below.

Since the diameter d of the valve 46 in the spool 40 is constant, as the gas flow rate at the inlet port 22 increases, the pressure $P_1$ at the inlet port 22 increases.

As mentioned above, the internal pressure of the pilot chamber 30 is kept ΔP higher than the pressure $P_1$ at the inlet port 22, so the internal pressure ($P_1+\Delta P$) of the pilot chamber 30 also increases as $P_1$ increases.

As the internal pressure of the pilot chamber 30, $P_1+\Delta P$, increases, the lower sliding section 44 for the spool 40 is pushed up, which moves up the spool 40 axially to increase the opening of the valve 46. As a result, more gas flows from the inlet port 22 into the outlet port 24. Thus, the pressure $P_1$ at the inlet port 22 is held constant.

In this pressure control system 10, the pressure $P_1$ at the inlet port 22 is detected by the pressure sensor S through the pressure sensor piping SP and the output of the sensor S is fed back to the control circuit C.

As stated above, when the pressure $P_1$ at the inlet port 22 increases, the control circuit C actuates the control valve V to increase the pressure by ΔP for supply of regulating gas to the pilot chamber 30.

As a consequence, the internal pressure ($P_1+\Delta P$) of the pilot chamber 30 increases, which, in a way similar to the above, pushes up the lower sliding section 44 and thereby moves the spool 40 up axially, thereby increasing the opening of the valve 46. This increases the gas flow from the inlet port 22 into the outlet port 24, thus maintaining the pressure $P_1$ at the inlet port 22 constant.

Figure 2:
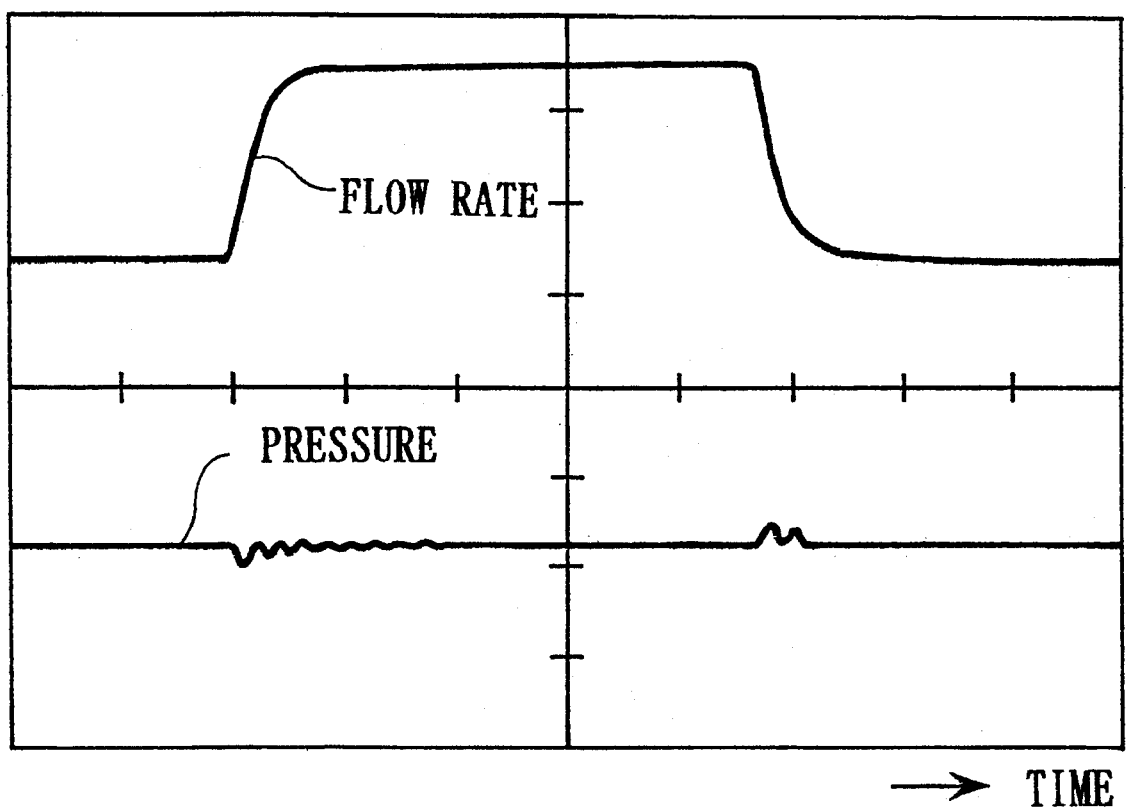
FIG. 2 is a graph of flow rate vs. pressure for the pressure control system shown in FIG. 1.

FIG. 2 is a graph that shows the characteristic of the above-mentioned pressure control system 10 according to the present invention.

Figure 9:
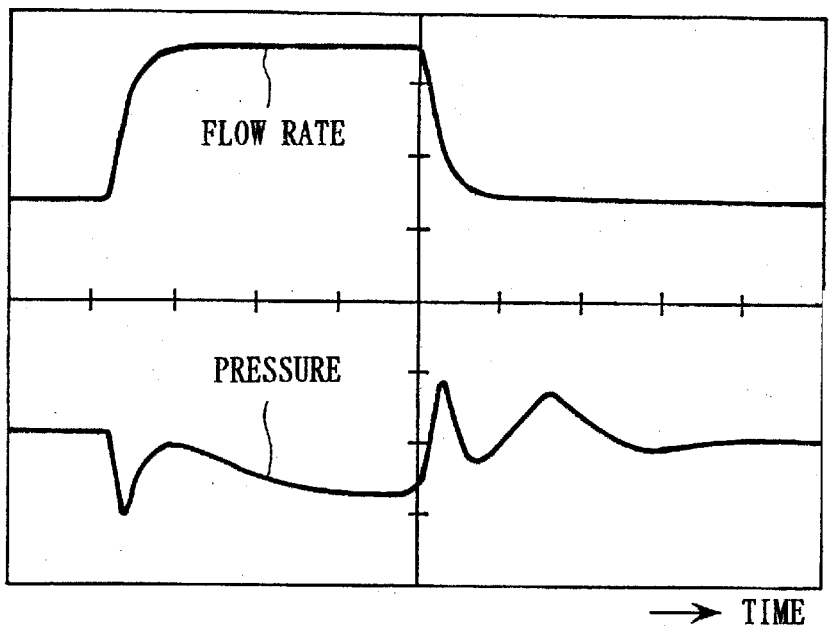
FIG. 9 is a graph of flow rate vs. pressure for the prior art pressure control system shown in FIG. 7.
Figure 10:
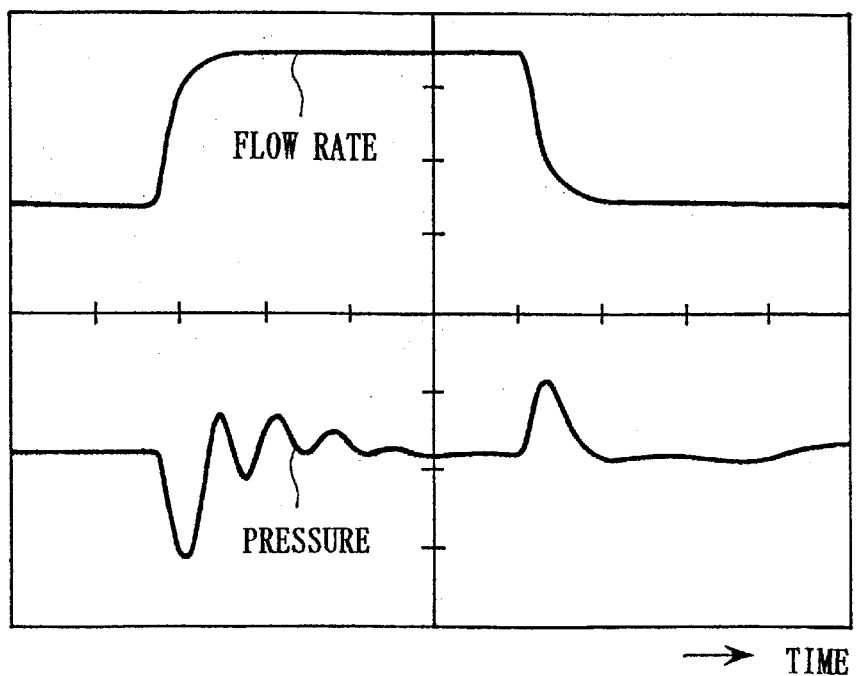
FIG. 10 is a graph of flow rate vs. pressure for the prior art pressure control system shown in FIG. 8.

The graph reveals that, in comparison with conventional pressure control systems whose characteristics are shown in FIGS. 9 and 10, the pressure control system 10 according to the present invention substantially reduces pressure variation with flow rate changes and considerably shortens the time of response to flow rate changes.

Figure 3:
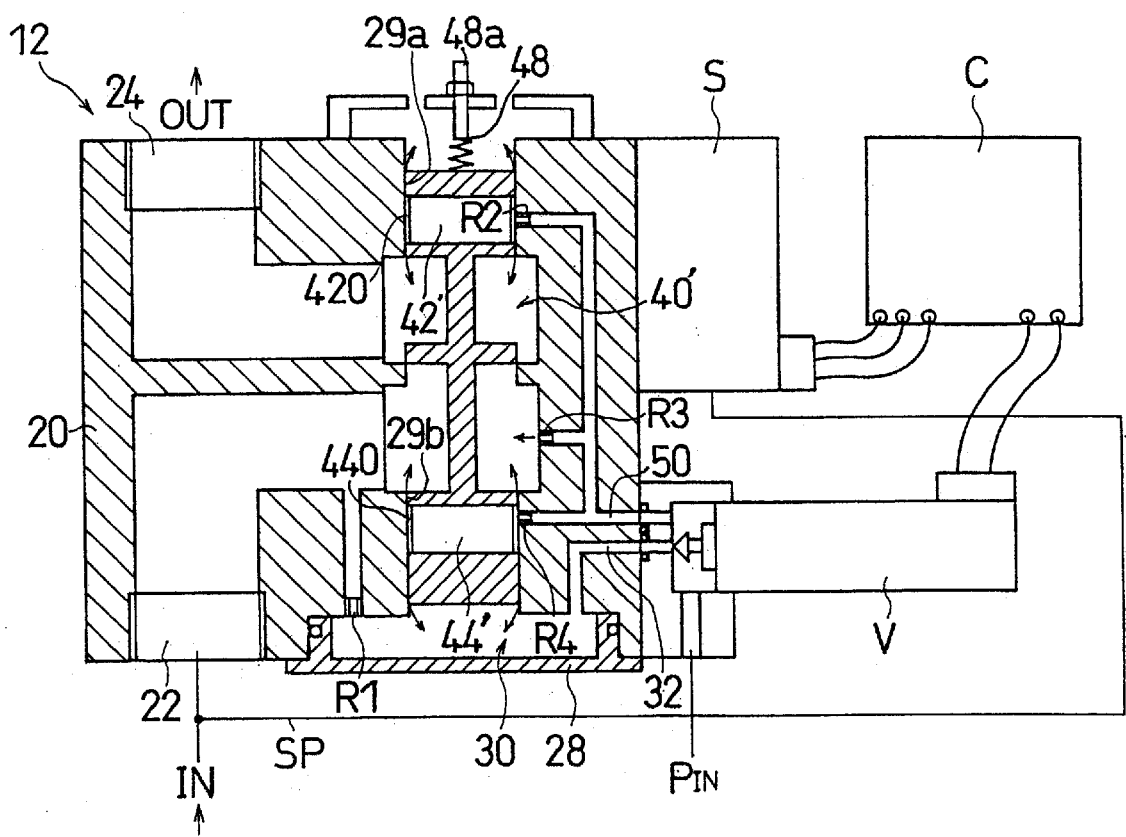
FIG. 3 is a partially schematic cross-sectional view of the structure of the pressure control system according to the second embodiment of the invention.

FIG. 3 shows the structure of a pressure control system 12 according to a second embodiment of the invention.

In this embodiment, grooves 420 and 440 are provided on the side faces of the upper sliding section 42' and the lower sliding section 44' for the spool 40'.

The main body 20 also includes the side faces of the upper sliding section 42, and lower sliding section 44' for the spool 40' and the piping 50 for supply of regulating gas to the inlet port 22. This piping 50 is connected to the control valve V.

In this embodiment, all the structure except the above-mentioned spool 40' and piping 50 is the same as in the first embodiment.

In this embodiment, regulating gas is evenly supplied into between the sliding surfaces of the main body 20 and the sliding sections 42' and 44', through the grooves 420 and 440 provided on the side faces of the sliding sections 42' and 44' for the spool 40', so that no dust or foreign matter enters the space between the spool 40' and the sliding surfaces 29a and 29b of the main body 20, and sliding friction between the spool 40' and the sliding surfaces 29a and 29b of the main body 20 is reduced, thereby ensuring a smoother movement of the spool.

Also, if the flow rate of gas which passes through the inlet port 22 is not enough to obtain a specified amount of opening of the valve by the pressure $P_1$ at the inlet port 22, regulating gas can be supplied to the inlet port 22 through the piping 50 in order to obtain and maintain the specified amount of opening of the valve.

Restrictors R2, R3 and R4 are provided at the ends of the piping 50 and the diameters of the restrictors R2, R3 and R4 determine the distribution ratio for the gas supplied from the control valve V.

Figure 4:
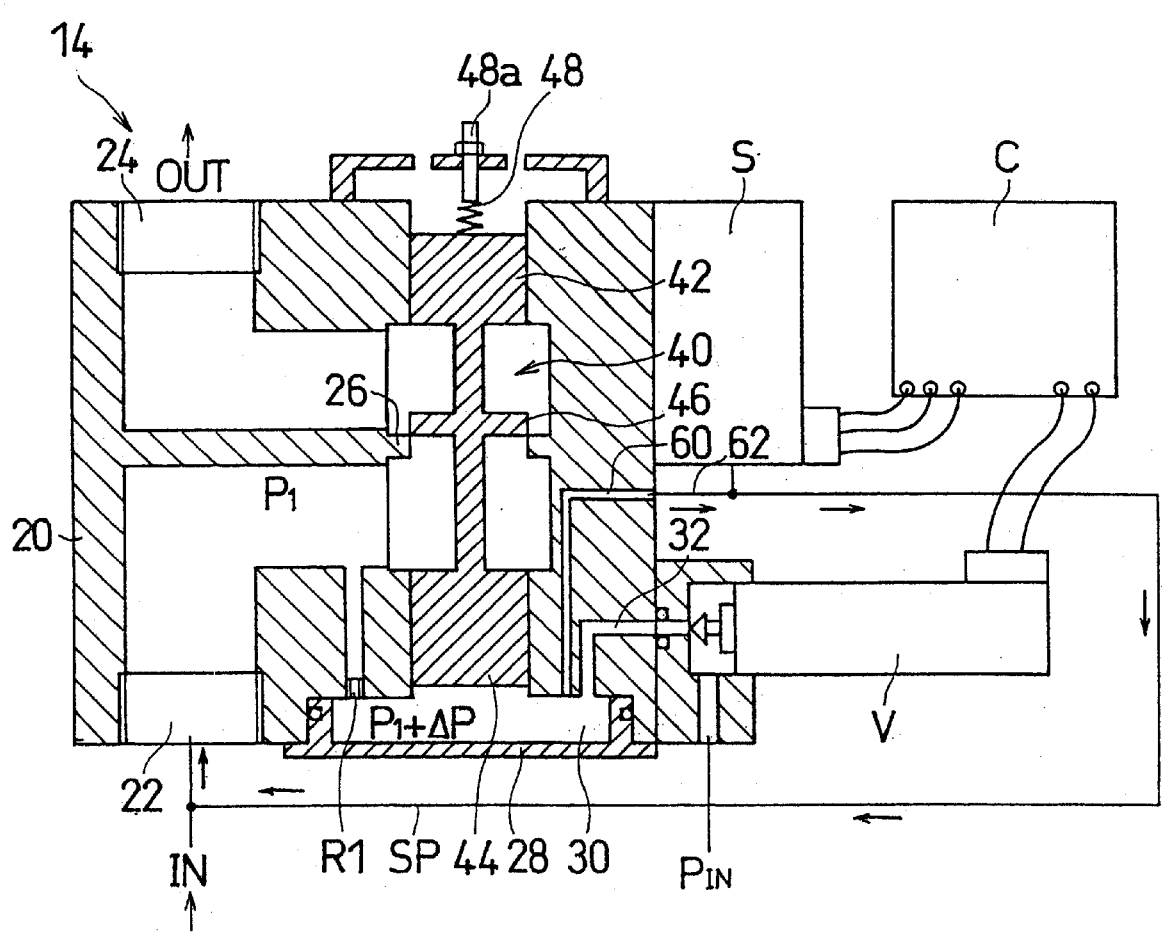
FIG. 4 is a partially schematic cross-sectional view of the structure of the pressure control system according to the third embodiment of the invention.

FIG. 4 shows the structure of a pressure control system 14 according to a third embodiment of the present invention.

In this embodiment, the pressure control system is the same as the pressure control system 10 in the first embodiment except that the parts to come into contact with gases are made of polytetrafluoroethylene (PTFE, Teflon) or polyether etherketone (PEEK), a corrosion-resistant plastic. In particular, the use of such material is effective for corrosive gases that pass through the inlet port.

For instance, in case of this embodiment, the main body 20 and the bottom cover 28 are made of PTFE and the spool is made of PEEK.

In the pressure control system 14 of this embodiment, which is similar to that of the first embodiment, there are a purge passage 60 from the pilot chamber 30 and a sensor passage 62 from the pressure sensor piping SP. The purge passage 60 and sensor passage 62 are connected to each other.

In the above pressure control system 14, since the internal pressure of the pilot chamber 30 is also maintained at a level ΔP higher than the pressure $P_1$ of the gas passing through the inlet port 22, part of the regulating gas in the pilot chamber 30 flows through the purge passage 60, sensor passage 62 and pressure sensor piping SP into the inlet port 22.

In addition, because the diameter of the pressure sensor piping SP is larger than that of the purge passage 60 and a restrictor (not shown) is provided in the purge passage 60 or sensor passage 62, pressure loss in the pressure sensor piping SP is reduced, resulting in the pressure detected by the pressure sensor S being almost equal to the pressure $P_1$ at the inlet port 22.

For functional reasons, it is generally difficult to use corrosion-resistant materials, such as PTFE and PEEK, for making the pressure sensor S. In this embodiment, however, because the gas which passes through the inlet port 22 never flows through the pressure sensor piping SP, there is no chance for the gas passing through the inlet port 22 (even if it is corrosive) to come into direct contact with the pressure sensor S, permitting accurate pressure measurement.

Figure 5:
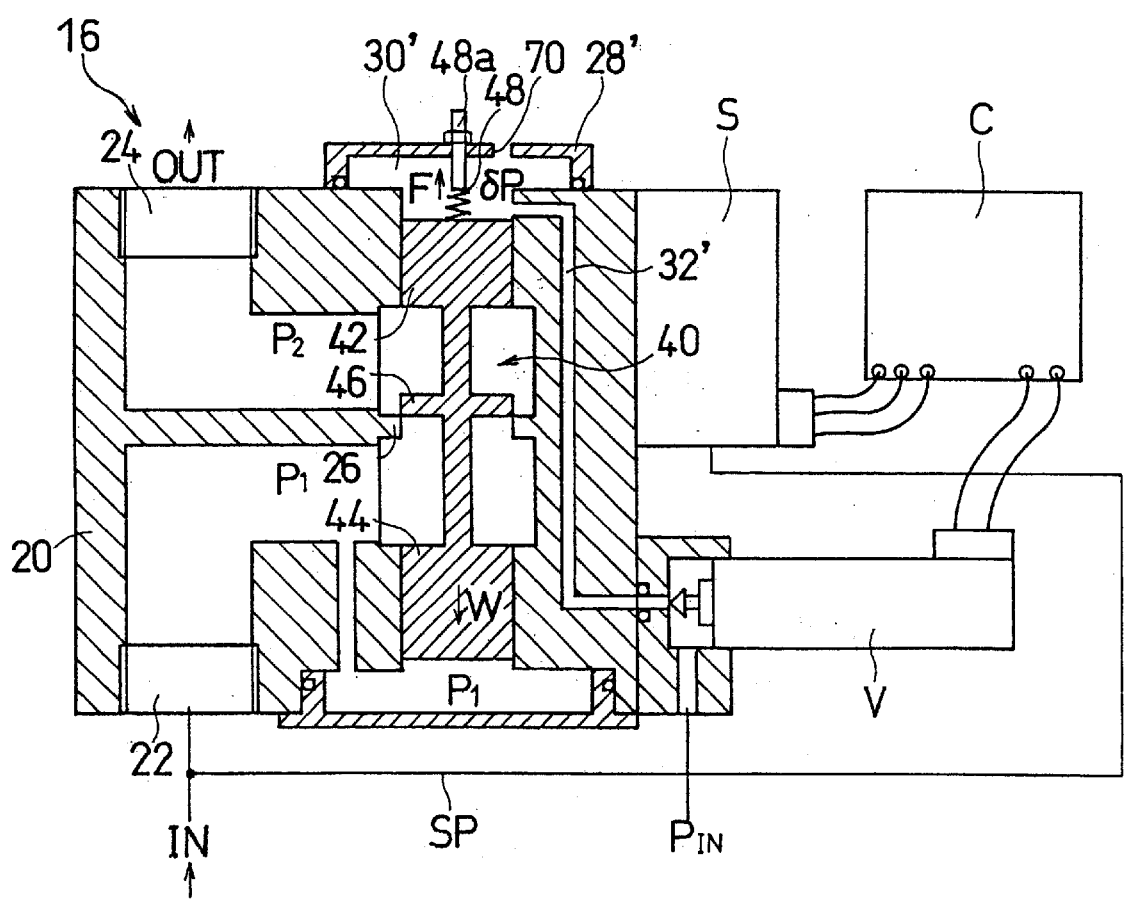
FIG. 5 is a partially schematic cross-sectional view of the structure of the pressure control system according to the fourth embodiment of the invention.

FIG. 5 shows the structure of a pressure control system 16 according to a fourth embodiment of the present invention.

In this embodiment, a pilot chamber 30' which is enclosed by a top cover 28', is located in the upper portion of the main body 20. This pilot chamber 30' is connected to the outside through a bleed port 70 provided on the top cover 28'.

Regulating gas is supplied from the control valve V into the pilot chamber 30' through a pilot passage 32' so as to maintain the internal pressure of the pilot chamber 30' at the level of δP.

The constituent parts, other than the above, are the same as those in the first embodiment.

In the pressure control system 16 of this embodiment, the equilibrium of the spool 40 is expressed by the following equation:

$$F - W - \tfrac{1}{4} \cdot \pi d^2 \cdot \delta P + \tfrac{1}{4} \cdot \pi d^2 \cdot P_1 = 0,$$

where F denotes the spring force, W is the weight of the spool, $P_1$ is the gas pressure at the inlet port 22, $P_2$ is the gas pressure at the outlet port 24, d is the diameter of the valve of the spool 40 and δP is the internal pressure of the pilot chamber 30'.

Therefore, the pressure $P_1$ of the gas passing through the inlet port 22 is expressed by the following equation:

$$P_1 = \frac{4}{\pi d^2} \cdot (W - F) + \delta P.$$

Here, the weight W of the spool 40 is constant so the pressure $P_1$ of the gas passing through the inlet port 22 depends only on the spring force F and the internal pressure δP of the pilot chamber 30'. $P_1$ is independent of the gas pressure $P_2$ at the outlet port 24.

This means that in the pressure control system 16 of this embodiment, in order to keep the gas pressure $P_1$ at the inlet port 22 constant, the pressure of regulating gas from the control valve V should be adjusted so that the spring force F and the internal pressure δP of the pilot chamber 30 are constant.

Figure 6:
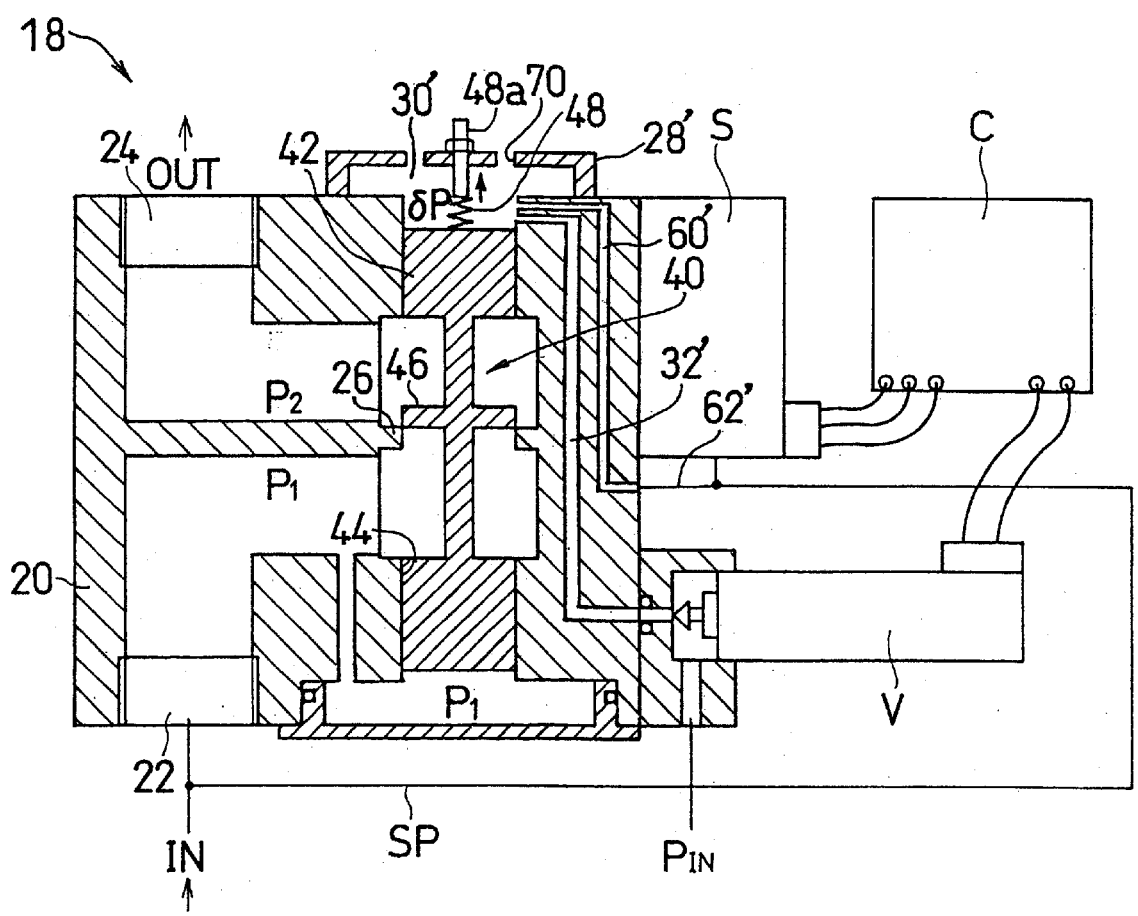
FIG. 6 is a partially schematic cross-sectional view of the structure of the pressure control system according to the fifth embodiment of the invention.
Figure 7:
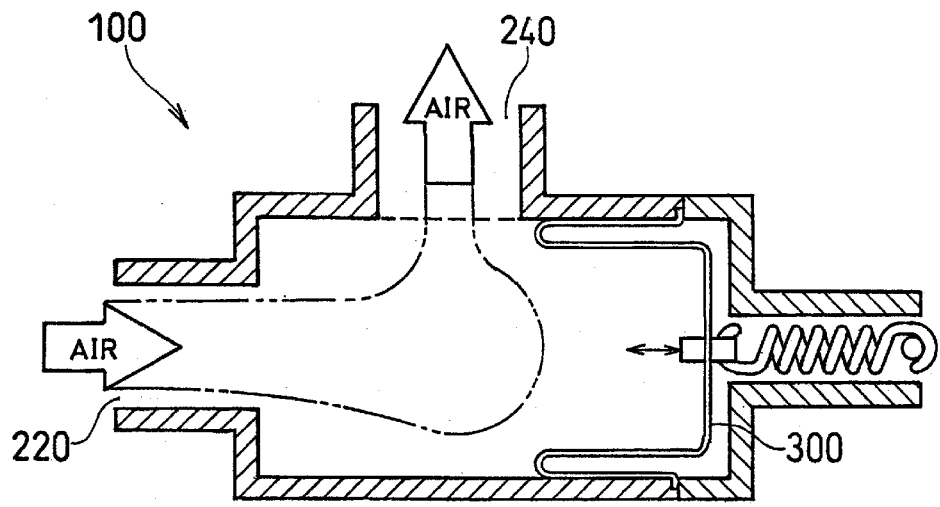
FIG. 7 is a partially schematic cross-sectional view of a prior art pressure control system.
Figure 8:
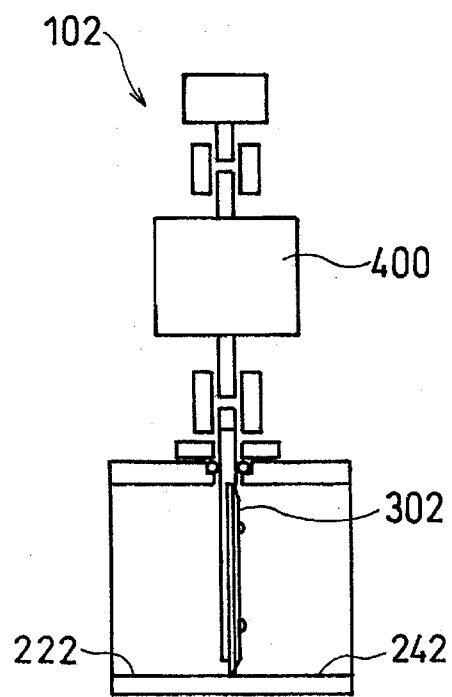
FIG. 8 is a partially schematic cross-sectional view of another prior art pressure control system.

FIG. 6 shows the structure of a pressure control system 18 according to a fifth embodiment of the present invention.

In the pressure control system 18 of this embodiment, which has a structure similar to that as shown in FIG. 5, there is a purge passage 60' from the pilot chamber 30, and a sensor passage 62' from the pressure sensor piping SP and the purge passage 60' and sensor passage 62' are connected to each other.

In the pressure control system 18 of this embodiment, the parts to come into contact with gases are made of PEFT or PEEK as in the third embodiment of the invention.

In the above pressure control system 18, regulating gas is supplied from the control valve to the pilot chamber 30, through the pilot passage 32' to maintain the internal pressure of the pilot chamber 30', at the level of δP.

The pressure $P_1$ at the inlet port 22 is set to be below the atmospheric pressure and the pressure δP of the pilot chamber 30' is set to be above the atmospheric pressure.

The difference (δP−$P_1$) between the pressure δP of the pilot chamber 30, and the pressure $P_1$ at the inlet port 22 causes part of the regulating gas supplied to the pilot chamber 30, to flow into the purge passage 60' and then join the gas from the inlet port 22 through the sensor passage 62' and the pressure sensor piping δP.

Therefore, in the pressure control system 18 of this embodiment, as in the third embodiment, the gas to be controlled never comes into direct contact with the pressure sensors.

The above-mentioned pressure control systems 12, 14, 16 and 18 in the second to fifth embodiments of the present invention also provide excellent characteristics as the first embodiment does as shown in FIG. 2.

In the above embodiments, nitrogen is used as regulating gas. However, any other gas may be used if it does not react with the gas to be controlled and is stable.

As described above, the exhauster pressure control system according to the present invention produces the following effects: because regulating gas is supplied to the pilot chamber according to the gas pressure at the inlet port to move the spool axially by the internal pressure of the pilot chamber to actuate the valve, the gas pressure at the inlet port can be held constant simply by adjusting the regulating gas pressure, regardless of the gas pressure at the outlet port.

The gas pressure at the inlet port is detected by the pressure sensor and the sensor output is fed back, which remarkably improves the response to gas flow rate changes at the inlet port as well as accuracy and stability.

By providing grooves on the side faces of the spool to supply regulating gas into between the main body's sliding surfaces and the grooves, inflow of dust into between the spool and the main body can be prevented and sliding friction can be reduced, which smoothens the movement of the spool.

In addition, by supplying regulating gas to the inlet port, the presence of a specific amount of gas in the inlet port is ensured and the amount of opening of the valve can be kept above a specified level, even if the gas flow rate at the inlet port is insufficient.

Also, even if the gas to be controlled is corrosive, the possibility of the gas coming into contact with the pressure sensor can be eliminated by connecting the pilot chamber and pressure sensor to allow regulating gas to flow into the pressure sensor piping.

Explanation of Reference Numerals and Signs in the Drawings
10, 12, 14, 16, 18: pressure control systems
20: main body
22: inlet port 24: outlet port
26: valve seat
30, 30': pilot chambers
40, 40': spools
46: valve
S: pressure sensor
C: control circuit
V: control valve

What is claimed is:

1. An exhauster pressure control system comprising a main body in which an inlet port and an outlet port are formed and a pilot chamber is provided; and a spool with a valve, wherein a valve seat is formed on sliding surfaces connecting the inlet port and the outlet port in said main body and said spool is held against said sliding surfaces by a force of a spring, the system being characterized by a pressure sensor to detect a pressure at said inlet port, a control valve to supply regulating gas to said pilot chamber and a control circuit to drive said control valve according to an output of said pressure sensor.

2. The exhauster pressure control system as defined in claim 1, wherein said pilot chamber is located below said spool and said regulating gas is supplied so that an internal pressure of said pilot chamber is higher than the pressure of at said inlet port.

3. The exhauster pressure control system as defined in claim 1, wherein grooves are formed on side faces of said spool and said regulating gas is supplied into the grooves.

4. The exhauster pressure control system as defined in claim 1, wherein said regulating gas is supplied to said inlet port.

5. The exhauster pressure control system as defined in claim 1, wherein said pilot chamber is connected to said pressure sensor.

6. The exhauster pressure control system as defined in claim 1, wherein said pilot chamber is located above said spool and said pilot chamber is connected to the atmosphere.

7. The exhauster pressure control system as defined in claim 6, wherein said pilot chamber is connected to said pressure sensor.

8. The exhauster pressure control system as defined in claim 2, wherein grooves are formed on side faces of said spool and said regulating gas is supplied into the grooves.

9. The exhauster pressure control system as defined in claim 2, wherein said regulating gas is supplied to said inlet port.

10. The exhauster pressure control system as defined in claim 2, wherein said pilot chamber is connected to said pressure sensor.

* * * * *